July 23, 1963
H. L. MARTIN
3,098,984
BOLOMETER MOUNTING MEANS FOR USE IN COAXIAL TRANSMISSION LINES
Filed Feb. 28, 1961
2 Sheets-Sheet 1
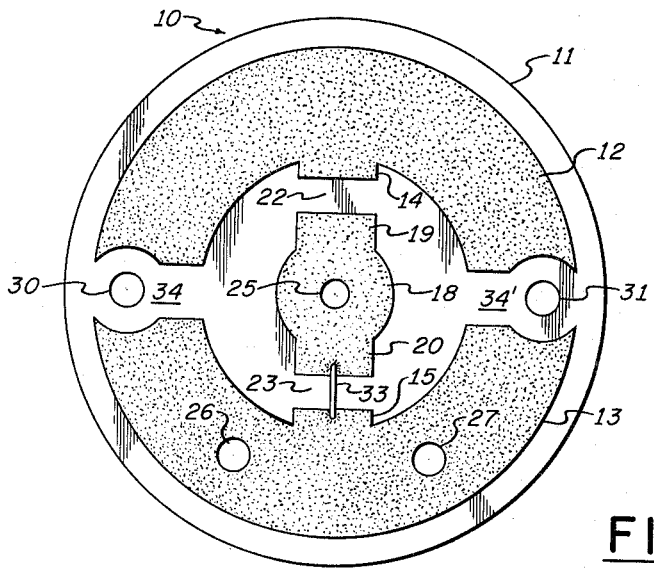
FIG.1.
FIG.2.
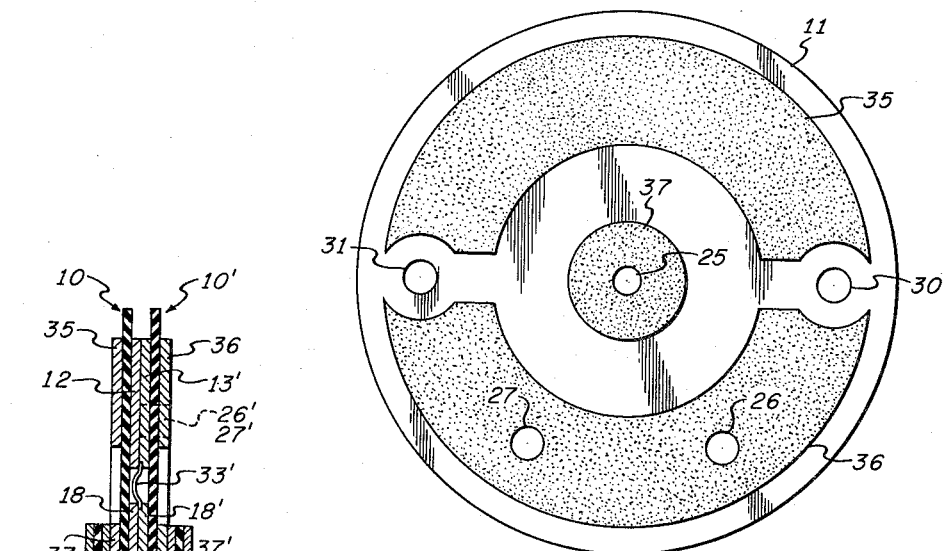
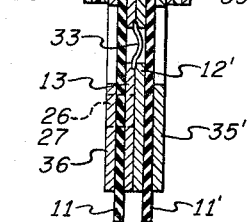
FIG.3.
INVENTOR.
HOWARD L. MARTIN
BY
ATTORNEY July 23, 1963

H. L. MARTIN 3,098,984

BOLOMETER MOUNTING MEANS FOR USE IN COAXIAL TRANSMISSION LINES

Filed Feb. 28, 1961

INVENTOR.
HOWARD L. MARTIN
BY

*Henry Huff*

ATTORNEY

United States Patent Office 3,098,984
Patented July 23, 1963

3,098,984
BOLOMETER MOUNTING MEANS FOR USE IN
COAXIAL TRANSMISSION LINES
Howard L. Martin, Safety Harbor, Fla., assignor to Sperry
Rand Corporation, Great Neck, N.Y., a corporation of
Delaware
Filed Feb. 28, 1961, Ser. No. 92,229
6 Claims. (Cl. 333—22)

This invention relates to bolometers for use in the measurement of high frequency power in coaxial transmission lines, and more particularly relates to novel means and apparatus for arranging and supporting the power-sensitive bolometer elements, and for mounting them in a bolometer mount.

Low-power microwave power measuring apparatus often employs bolometer elements such as barretters and thermistors as the power-sensitive elements. Both of these types of elements are comprised of very fine wires and are extremely small and delicate, so that great care must be exercised in the manufacture, assembly, testing and operation of the elements. The bolometer elements must be arranged and mounted so as to present a good impedance match to the coaxial transmission line which they terminate, and to provide a direct current conduction path therethrough to the external metering circuit. In addition to satisfying the above requirements, the practical consideration of ease and economy of manufacture and assembly must be satisfied.

It therefore is an object of this invention to provide an improved means for mounting bolometer elements in a coaxial transmission line.

A further object is to provide mounting means for bolometer elements which affords substantial support and protection for the delicate elements.

Another object of this invention is to provide a bolometer element assembly which is relatively simple and economical to manufacture, and which may be easily assembled and installed by relatively unskilled workers.

Another object of this invention is to provide a broadband bolometer mount for use in measuring the power level of high frequency energy propagating in a coaxial transmission line.

The invention will be described by referring to the accompanying drawings wherein:

FIGS. 1 and 2, respectively, are front and back views of a bolometer disc upon which a bolometer element is mounted;

FIG. 3 is a transverse sectional view of a completed bolometer disc assembly;

Figure 4:
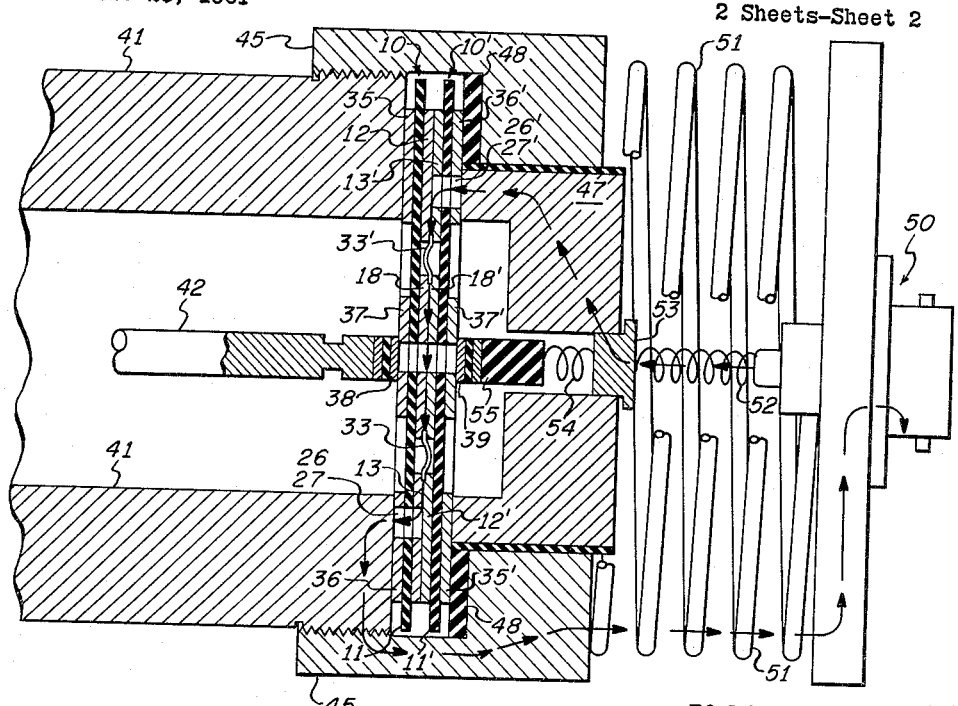
FIG. 4 is a longitudinal sectional view of a bolometer mount employing the bolometer disc assembly of FIGS. 1–3.

Referring now in detail to the drawings,

FIG. 1 shows the front face of a bolometer disc 10 comprised of a thin, flat disc 11 of a low loss dielectric material such as mica having two centrally concave arcuate conductive surface 12 and 13 disposed diametrically opposite each other. These arcuate surfaces have short centrally extending stubs 14 and 15, respectively. A centrally positioned conductive area 18 has two radially extending stubs 19 and 20 directly opposite the centrally extending stubs 14 and 15, and respectively separated therefrom by gaps 22 and 23. All conductive surfaces may be comprised of a conductive paint, such as silver paint, and may be brushed, sprayed or rolled onto the face of the mica disc 11. A hole 25 extends through the center of conductive area 18, and two holes 26 and 27 extend through the disc in the area of the outside arcuate conductive surface 13. Additional holes 30 and 31 extend through dielectric disc 11 in the outer gaps 34 and 34′ separating arcuate conductive surfaces 12 and 13. A bolometer element 33, illustrated as a barretter wire, extends across the gap 23 and is soldered to the conductive stubs 15 and 20. The size, shape, and arrangement of conductive stubs 14, 15, 19 and 20, and the spacings of gaps 22 and 23 are chosen to form capacitors to aid in achieving an impedance match between the bolometer disc assembly and the coaxial transmission line to which it is coupled. Likewise, the gaps 34 and 34′ and the ends of the arcuate conductive members 12 and 13 form similar capacitors for use in impedance matching the disc assembly to the transmission line.

The back surface of dielectric disc 11, FIG. 2, also has two diametrically disposed outer arcuate conductive surfaces 35 and 36 and a centrally positioned conductive surface 37. It will be noted that there are no stubs projecting from any of the conductive surfaces on the back face of dielectric disc 11. The respective outer and central conductive surfaces on the front and back faces of dielectric disc 11 are in registration with each other so that in a plane view there would be substantially no overlap, except for the stubs, of the respective outer and central conductive surfaces on the two faces. When the conductive paint is applied to the surfaces of dielectric disc 11, the paint is allowed to flow through the central hole 25 and the holes 26 and 27 in order to provide conductive continuity between the central conductive surfaces 18 and 37 of the two faces, and between two outer arcuate surfaces 13 and 36 on the opposite faces. No conductive continuity is established between the outer arcuate conductive surfaces 12 and 35 on the opposite faces of dielectric disc 11.

In the bolometer disc assembly of this invention, two identical discs as just described are employed. The two discs are placed together with their front faces in contact and with their conductive surfaces in registration with each other, and with their respective bolometer elements positioned 180° apart, as illustrated in FIG. 3. To attain the desired registration of the conductive surfaces on the opposing front faces of the two discs, the two discs may be placed on a jig having two upstanding posts which extend through the holes 30 and 31 in dielectric disc 11. The two discs are glued together with a suitable adhesive material. For reasons to be explained later, it is desired that the two discs be glued together in a manner which will permit them to be later separated, if necessary. In this condition, it must be assumed that electrical continuity is established between the adjacent conductive surfaces on the front faces of the assembled discs. The back faces of the two discs now form the outer faces of the bolometer disc assembly as illustrated in FIG. 3. Two similar capacitors 38 and 39, each comprised of a thin disc of a low loss dielectric material such as mica and having conductive surfaces on each of its flat faces, are secured respectively to the central conductive surfaces 37 on the back surfaces of the two assembled discs.

FIG. 4 is an enlarged and simplified illustration of the essential features of a bolometer mount that houses the bolometer disc assembly of FIG. 3. The left side of the mount is a coaxial transmission line comprised of outer and inner conductors 41 and 42 which terminate at their left ends in a type N, or other type of standard coaxial transmission line connector (not illustrated) for connecting the mount to a coaxial transmission line. The bolometer disc assembly comprised of two identical bolometer discs 10 and 10', having respective capacitors 38 and 39 attached thereon, abut against the right ends of outer and inner conductors 41 and 42. Outer conductor 41 is in electrical contact with the outer arcuate conductive surfaces 35 and 36 on the back face of bolometer disc 10, and inner conductor 42 is coupled through capacitor 38 to the centrally positioned conductive surface 37. Capacitor 38 provides a very low impedance, and thus a virtual short circuit, to very high frequency currents flowing on center conductor 42, but blocks the flow of direct current from the bolometer disc assembly to inner conductor 42. Outer housing member 45 is threadably engaged at its left end with outer conductor 41, and its right end is disposed coaxially about, and in contact with, the outer surface of cylindrical contact capacitor 47. The left end of contact capacitor 47 abuts against, and is in electrical contact with, outer arcurate members 35' and 36' on the back face of bolometer disc 10'. The outer cylindrical surface of contact capacitor 47 is covered with a thin coating of insulating material so that a large R.F. bypass capacitor is formed between outer housing member 45 and contact capacitor 47, thus providing virtually a short circuit to very high frequency waves. A dielectric washer 48 is positioned between the right outside face of the assembled bolometer discs and the shoulder of outer housing member 45 to provide mechanical support to the bolometer disc assembly.

A standard BNC connector 50 is located at the right end of the mount and provides connecting means to an external direct current metering circuit. Electrical connection between the outer conductor of BNC connector 50 and outer housing member 45 is established through a conductive helical spring 51, and electrical connection is established between the inner conductor of BNC connector 50 and contact capacitor 47 by means of a second conductive helical spring 52 and a conductive contact pin 53.

The D.C. circuit through the bolometer mount is illustrated in FIG. 4 by the small arrows and is seen to run from the inner conductor of BNC connector 50, through spring 52 and contact pin 53 to contact capacitor 47, and then to the outer arcuate conductive surface 36' on the back face of bolometer disc 10'. The circuit continues through the conductive run-through holes 26' and 27' in disc 10', to the outer arcuate conductive surface 13' on the front face of bolometer disc 10'. It again must be remembered that opposing conductive surfaces on the front faces on discs 10 and 10' are in electrical contact so that the D.C. path continues through surfaces 13' and 12 of discs 10' and 10, through barretter wire 33', through centrally positioned conductive surfaces 18, 18', through the bottom barretter wire 33, outer arcuate conductive surfaces 12' and 13, through conductive run-through holes 26, 27, through outer arcuate conductor surface 36, across outer conductor 41 and outer housing member 45, and through conductive spring 51 to the outer conductor of BNC conductor 50. Capacitor 38 isolates the D.C. circuit from inner conductor 42, and the capacitor formed between outer housing member 45 and contact capacitor 47 similarly isolates outer conductor 41 and outer housing member 45 from the D.C. circuit. It will be noted that the outer arcuate conductive surfaces 12 and 35 on the front and back faces of bolometer disc 10 also form a capacitor for isolating the D.C. circuit from outer conductor 41. This same type of capacitor also is formed by the outer arcuate conductive surfaces 35' and 12' on the opposite faces of bolometer disc 10'. It may thus be seen that the novel design and arrangement of the two identical bolometer discs forming the bolometer disc assembly inherently provides the D.C. current path for the metering circuit and also the necessary isolating and bypass capacitors. It also will be noticed that the bolometer disc assembly is completely symmetrical in that it may be inserted within the mount in any angular position, and without regard to which outside face is adjacent the center conductor 42. If the bolometer disc assembly illustrated in FIG. 4 were inserted in the mount in the reverse position, that is, discs 10 and 10' were reversed with respect to each other, the only difference would be that the D.C. circuit then would pass through the lower portion of contact capacitor 47, thence through the disc assembly, across the top portions of outer conductor 41 and outer housing 45, and then through helical spring 51 to BNC connector 50. This completely symmetrical feature of the bolometer disc assembly of this invention saves considerable time in the assembly of a bolometer mount and permits the assembly and replacement of the bolometer disc assemblies to be made by relatively unskilled laborers since it is impossible to make a mistake in the positioning of the assembled bolometer discs.

Another outstanding feature of the bolometer disc assembly is evident from FIG. 4. That is, both of the fine, delicate barretter wires 33 and 33' are on the inside faces of the two assembled bolometer discs 10 and 10', and thus are protected by the discs 10 and 10' from possible damage which might otherwise occur during assembling and testing if said bolometer elements were exposed as they are in other known bolometer discs. A further advantageous feature is that should one of the barretter wires or discs become damaged during testing or assembling, only one of the discs need be discarded and the other disc with the good barretter wire may be retained. For this reason it is desirable that the two discs should not be too securely glued together. This also is a distinct advantage over other known types of bolometer discs wherein both barretter wires are on a single disc. In these other types of discs, if one of the barretter wires or the disc become damaged, the entire disc including the undamaged barretter wire must be discarded.

Figure 5:
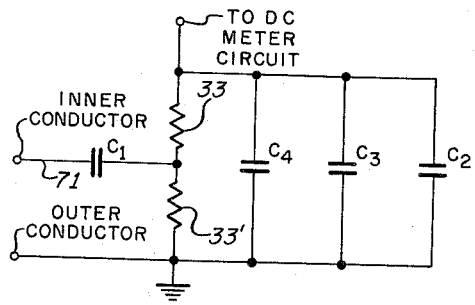
FIG. 5 is a circuit schematic diagram illustrating a simplified equivalent circuit of the bolometer mount of FIG. 4; and, FIG. 6 is a front view of a bolometer disc particularly useful for use with bead thermistors.

A simplified equivalent circuit of the bolometer mount of FIG. 4 is illustrated in FIG. 5 wherein the capacitor $C_1$ in the inner conductor 71 is formed by capacitor 38 of FIGS. 3 and 4. Capacitor $C_2$ is formed by the capacitor between outer housing member 45 and contact capacitor 47, while capacitor $C_3$ is formed by outer arcuate conductive surfaces 12 and 35 and the dielectric disc therebetween on the front and back faces of bolometer disc 10. Capacitor $C_4$ is formed by the outer arcuate conductive surfaces 12' and 35' and the dielectric disc therebetween on the inner and outer faces of bolometer disc 10'. As may be seen in FIGS. 4 and 5, barretter wires 33 and 33' are in series connection in the D.C. circuit and are in parallel in the A.C. circuit.

Figure 6:
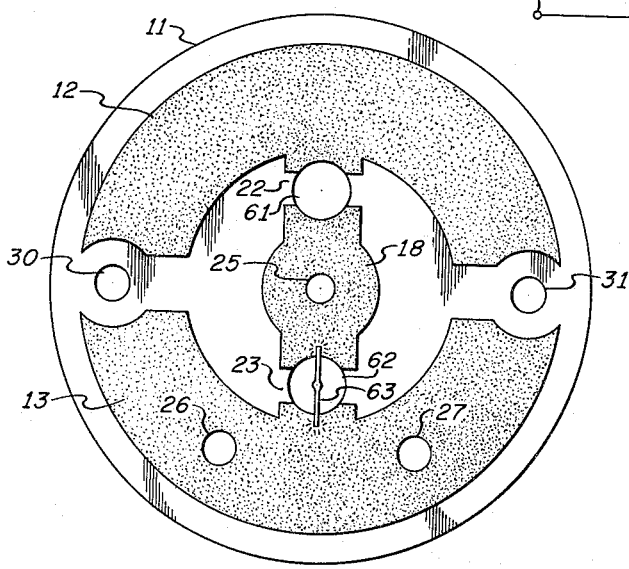

FIG. 6 is a front view of a bolometer disc assembly of this invention particularly useful with thermistor bead types of bolometer elements. The bolometer discs of this embodiment are substantially identical to those previously described with the exception that two holes 61 and 62 are provided in the dielectric disc 11 at the gaps 22 and 23 between the outer arcuate conductive surfaces 12 and 13 and the inner centrally positioned conductive surface 18. The thermistor bead 63 is connected across the hole 62 and is positioned therein so as to be physically protected. In all other respects, the disc assembly illustrated in FIG. 6 is identical to the discs illustrated in FIGS. 1, 2 and 3.

Bolometer discs constructed as illustrated in the drawings had the following approximate dimensions:

|   | Inch |
|---|---|
| Diameter of dielectric disc 11 (mica) | .558 |
| Thickness of dielectric disc 11 | .002 |
| Width of arcuate conductive surfaces 12, 13, 35, 36 | .1125 |
| Radius of curvature of inner edge of arcuate conductive surfaces 11, 12, 35, 36 | .138 |
| Diameter of central conductive surfaces 18, 37 | .120 |
| Width of inner gaps 22, 23 | .030 |
| Width of outer gaps 34, 34' | .050 |
| Width of conductive stubs 14, 15, 19, 20 | .080 |
| Diameter of holes 25, 26, 27 | .032 |

The bolometer disc assembly of this invention employing barretter wires operated in a suitable bolometer mount with a maximum voltage standing wave ratio (VSWR) of 1.5 over a frequency range of .5 to 10.0 kmc., and with thermistors operated with a maximum VSWR of 1.5 over the frequency range of .5 to 11.0 kmc.

While the invention has been described in its preferred embodiments, it is to be understood that the words which have been used are words of description rather than limitation and that changes within the purview of the appended claims may be made without departing from the true scope and spirit of the invention in its broader aspects.

What is being claimed is:

1. Apparatus for mounting a bolometer element for insertion in a coaxial transmission line bolometer mount comprising a thin disc of dielectric material, a first pair of centrally concave arcuate conductive surfaces disposed diametrically opposite each other on a first face of said disc, said arcuate conductive surfaces of said first pair being separated from each other at their ends by a pair of small gaps disposed diametrically opposite each other, a centrally positioned conductive surface on said first face and separated from each of said arcuate surfaces by a small gap adjacent the mid-region of each of said arcuate surfaces, a second pair of centrally concave arcuate conductive surfaces disposed diametrically opposite each other on the other face of said disc and in substantial registration with the first pair of arcuate conductive surfaces, a centrally positioned conductive surface on said other face, means for providing conductive continuity between the centrally positioned conductive surfaces on opposite faces of said disc and also between two registering arcuate surfaces on opposite faces of said disc, and a bolometer element conductively connected across one of said gaps on said first face between said centrally positioned conductive surface and the arcuate conductive surface having conductive continuity with a registering arcuate conductive surface on said other face of said disc.

2. The combination claimed in claim 1 including a capacitor secured to the centrally positioned conductive surface on said other face of the disc, said capacitor comprising a second thin disc of dielectric material having centrally positioned conductive surfaces on opposite faces thereof substantially the size of, and in registration with, the centrally positioned conductive surface on said other face of said first-named disc.

3. The combination claimed in claim 1 wherein said conductive surfaces are comprised of layers of conductive paint, and said means for establishing conductive continuity between said registering conductive surfaces on opposite faces of said disc is comprised of holes through said disc, and conductive paint extending through said holes thereby conductively connecting the conductive surfaces on opposite sides thereof.

4. Apparatus for mounting a bolometer element for insertion in a coaxial transmission line comprising a thin disc of dielectric material, a first pair of centrally concave arcuate conductive surfaces disposed diametrically opposite each other on a front face of said disc, each of said arcuate surfaces having an angular extent slightly less than 180°, whereby said arcuate surfaces are separated by a first pair of gaps at their respective adjacent ends, a centrally positioned conductive surface on said front face within said pair of arcuate conductive surfaces, each of said arcuate conductive surfaces having a short stub-like projection extending centrally from its mid-region, said centrally positioned conductive surface having a pair of short stub-like projections respectively extending in opposite radial directions, all of said stub-like projections lying along a diameter which is normal to a diameter through said first pair of gaps and the projections of said centrally positioned conductive surface being separated from the similar projections on said arcuate surfaces by a second pair of gaps, a second pair of arcuate conductive surfaces positioned on the back face of said disc in substantial registration with the first pair of arcuate conductive surfaces, a centrally positioned conductive surface on said back face within said pair of arcute conductive surfaces, means for establishing conductive continuity between the centrally positioned conductive surfaces on opposite faces of said disc and for establishing conductive continuity between two registering arcuate conductive surfaces on opposite faces of said disc, and a bolometer element spanning one of the gaps of said second pair of gaps on the front face of said disc and conductively connecting said centrally positioned conductive surface and the arcuate conductive surface which is conductively connected to a registering conductive surface on the back face of said disc.

5. A bolometer disc assembly for mounting two bolometer elements in a coaxial transmission line, said assembly including two substantially identical bolometer discs each comprised of a thin disc of dielectric material, a pair of outer centrally concave arcuate conductive surfaces on each face of each disc and a centrally positioned conductive surface on each face of each disc, the adjacent ends of the arcuate conductive surfaces of each pair being separated by respective gaps and the centrally positioned conductive surface on one of the faces of each disc being separated from each of the arcuate conductive surfaces on that face by a respective gap, and a bolometer element spanning one of the last-named gaps on each disc and conductively connecting the centrally positioned conductive surface and one of the arcuate conductive surfaces, and means for establishing conductive continuity between each of the conductive surfaces to which each bolometer element is connected and their respective registering conductive surface on the other face of the respective disc, like faces of said two bolometer discs being joined together with the bolometer elements being positioned 180° with respect to each other on the contacting faces and with the corresponding conductive surfaces of the contacting faces in substantial registration, and capacitor means respectively positioned on the centrally positioned conductive surfaces of the two outside faces of said assembled discs.

6. A bolometer disc assembly for mounting two bolometer elements in a coaxial transmission line, said assembly comprising a thin disc of dielectric material, a first pair of centrally concave arcuate conductive surfaces disposed diametrically opposite each other on a first face of said disc, a centrally positioned conductive surface on said first face and separated from each of said arcuate surfaces by a small gap adjacent the mid-region of each of said arcuate surfaces, a second pair of centrally concave arcuate conductive surfaces disposed diametrically opposite each other on the other face of said disc and in substantial registration with the first pair of arcuate conductive surfaces, a centrally positioned conductive surface on said other face, means for providing conductive continuity between the centrally positioned conductive surfaces on opposite faces of said disc and also between two registering arcuate surfaces on opposite faces of said disc, a bolometer element conductively connected across one of said gaps on said first face between said centrally positioned conductive surface and said arcuate conductive surface conductively connected to an arcuate conductive surface on the opposite face, said assembly further including a second dielectric disc substantially identical to said first disc and having conductive surfaces disposed thereon and a bolometer element mounted thereon in a manner identical to said first disc, said two discs being secured together with the conductive surfaces of their first faces in contact and in registration and with the respective bolometer elements of the two discs positioned 180° with respect to each other, and a capacitor comprised of a flat disc of dielectric material having centrally positioned conductive surfaces on its opposite faces, said last-named conductive surfaces being substantially the size of the centrally positioned conductive surface on the opposite faces of said first two discs, said capacitor being secured to the centrally positioned conductive surface on the outside face on one of said assembled discs.

References Cited in the file of this patent
UNITED STATES PATENTS

| | | |
|---|---|---|
| 2,667,618 | Waller | Jan. 26, 1954 |
| 2,921,663 | Jaffe | Jan. 12, 1960 |